No. 751,297. Patented February 2, 1904.

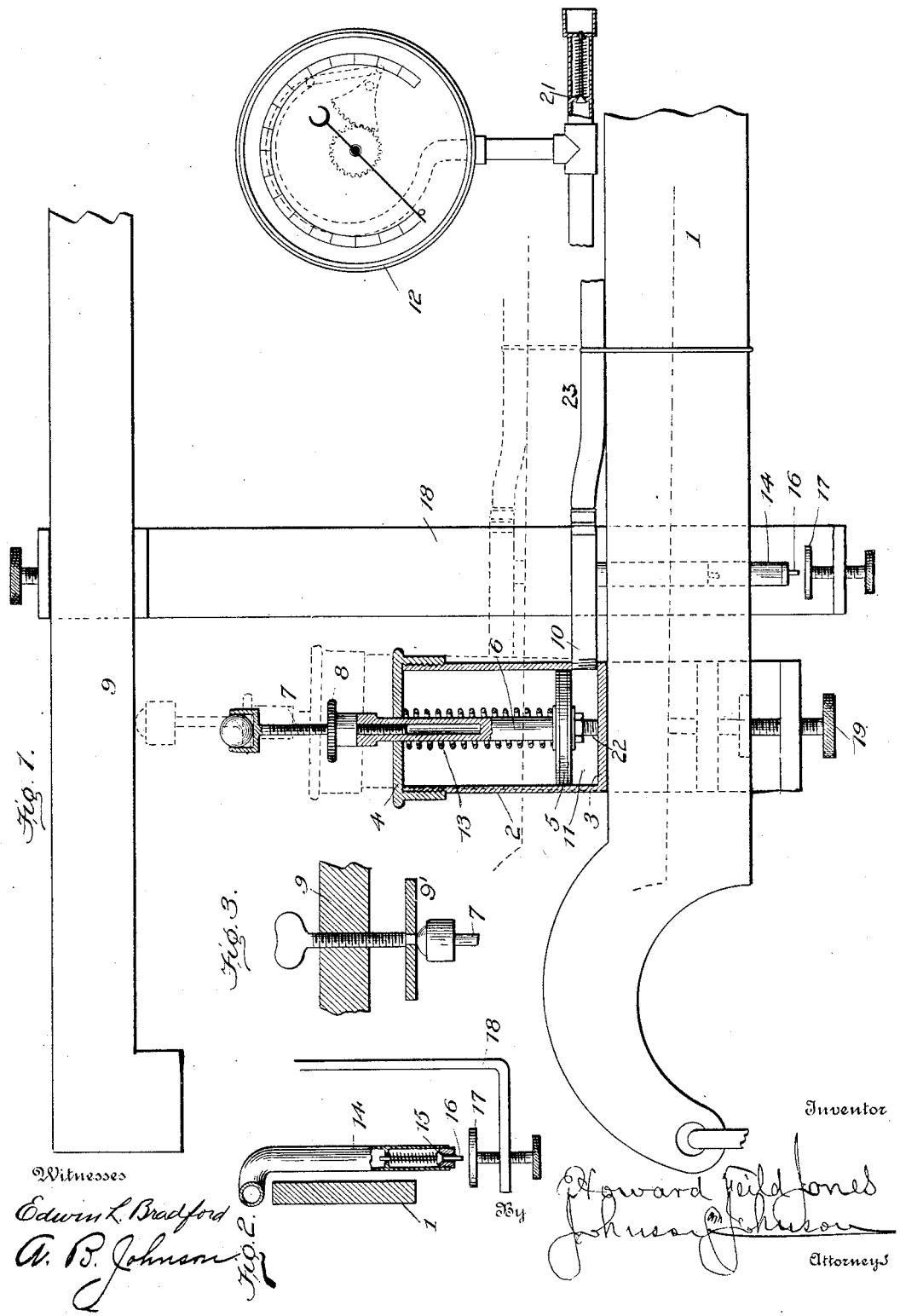

UNITED STATES PATENT OFFICE.

HOWARD FEILD JONES, OF WILSON, NORTH CAROLINA.

FLUID-PRESSURE WEIGHING-SCALE.

SPECIFICATION forming part of Letters Patent No. 751,297, dated February 2, 1904.

Application filed November 21, 1903. Serial No. 182,047. (No model.)

*To all whom it may concern:*

Be it known that I, HOWARD FEILD JONES, a citizen of the United States, residing at Wilson, in the county of Wilson and State of North Carolina, have invented certain new and useful Improvements in Fluid-Pressure Weighing-Scales; and I do hereby declare the following to be a full, clear, and exact description of the invention, such as will enable others skilled in the art to which it appertains to make and use the same.

The invention which is the subject of this patent has for its object the production of a weighing-beam scales in which a motive fluid is employed as the weighing element, and a distinguishing feature of the invention resides in the mounting of the fluid-pressure chamber directly upon and as a fixture of the weighing-beam and in the provision of a valve-vent actuated and controlled by the descent of the beam to allow it to lift itself to cause the closing of the vent, so that the pressure within the fluid-chamber will equalize itself and effect a balance of the weight on the platform, and thus indicate the true amount of pressure and the weight of the article being weighed. These and other features of novelty will be pointed out in the claims appended hereto.

The following description, read in connection with the accompanying drawings, will enable any one skilled in the art of weighing by pneumatic pressure to understand its nature and to practice it in the form in which I prefer to employ it; but it will be understood that my invention is not limited to the precise form and details of construction herein illustrated and described, as various modifications and changes may be made without exceeding the scope of the claims in which my invention is set out.

Referring to the drawings, Figure 1 represents my improved air-scales in which the air-pressure chamber is shown in vertical section directly on the beam and in communication with the fluid-pressure-supply pipe and the beam in balanced position, as when not weighing, the dotted lines showing the beam in the raised position it assumes when the article to be weighed is put upon the platform. Fig. 2 shows the beam in cross-section and the relation thereto of the vent-valve in the fluid-pressure-supply pipe and the stop for actuating the vent-valve. Fig. 3 shows a modified form of the stop for the piston-rod of the fluid-pressure chamber.

The drawings show a portion of the scale-beam 1 which is fulcrumed in the platform-standard and connected to the weighing-platform in a manner well known, and it is deemed unnecessary to either show or describe such parts.

The fluid-pressure weighing device consists of a cylinder or casing 2, mounted upon a base 3, which is mounted and made slidable on the beam as a means of fastening the cylinder on the beam and for balancing the beam. The cylinder is closed at both ends, its cap 4 being removable for access to its interior. A piston 5 is fitted within the cylinder and provided with a piston-rod 6, passing through the cap of the cylinder. This rod may be provided with an extensible section 7, which, as shown, is a screw-rod, which is rendered adjustable by a nut 8 on the screw-stem, so as to lengthen or shorten the piston-rod in its relation to an overhead fixed arm 9 of the scale-standard and which serves to limit the ascent of the piston for a purpose which I will presently state. At or near the seating of the cylinder on the beam the fluid-pressure-supply tube 10 enters the cylinder and forms therein a pressure-chamber 11, of which the piston forms the movable head, while the bottom of the cylinder forms the fixed head, and between these two heads the fluid-supply tube is in perpetual communication with the fluid-chamber. This tube extends along and preferably rests upon the top edge of the beam and terminates in a source of supply, which may be a simple bicycle-pump, for furnishing compressed air and between which and the pressure-chamber one or more pressure-gages 12 are mounted in communication with the fluid-supply pipe for indicating through the medium of the compressed fluid the weight of the article on the platform. The admission of the motive fluid for this purpose into the pressure-chamber causes the piston to rise until the piston-rod comes in contact with the overhead arm, as shown by dotted lines in Fig. 1, and thus limit the ascent of the piston and, preventing its further ascent, causes the pressure in the cylinder-chamber to be exerted on the bottom of the chamber, and thereby forces the cylinder with its connected beam downward to balanced position, and the excess of pressure being automatically vented will cause the gage to indicate the weight of the article on the platform. A spring 13 within the cylinder serves to return the piston to its normal position when an excess of air-pressure in the chamber has been vented. This venting is effected automatically by the downward movement of the beam, and for this purpose the vent may be located at any point in communication with the fluid-pressure chamber so long as the vent is effected by the beam. A convenient arrangement for this vent is the provision in the fluid-pressure-supply tube of a depending branch 14, containing a normally spring-closed valve 15, the stem 16 of which projects below the valve-tube, so that the descent of the beam will cause the valve-stem to come in contact with a stop 17, and thereby lift the spring-pressed valve to open the pressure-chamber to the air. This stop is adjustable, so that the valve-vent may be operated at any predetermined position of the beam, and thereby venting only sufficient air to allow the beam to be raised by the weight on the platform and allow the vent-valve to be closed by its spring. The duration of the air-venting is sufficient to allow the excess of air-pressure to escape from the pressure-chamber, when the beam will rise, stop the vent, and stand balanced. A hanger 18, clamped to the arm above the beam, carries this valve-venting stop, which is a screw 17, that may be set nearer to or farther from the valve-stem and is adjusted to make the contact with the valve-stem, as may be desired. The pressure-chamber cylinder is slidable with its vent connection on the beam and is clamped thereon by a set-screw 19 when the beam has been balanced by the air-pressure cylinder, and as this adjustment of the cylinder carries with it the pressure-fluid-supply tube and its vent connection it is necessary to set the vent-actuating stop so that it will be in vertical alinement with the vent-valve stem, and for this purpose the hanger of the stop is made slidable on the arm by a suitable clamp 20, so that the hanger is slid on its arm to bring and to hold the stop in position to be struck by the vent-valve stem as the beam is caused to fall under the pressure of the motive fluid in the cylinder-chamber. Between the pressure-gage and the source supplying compressed air the supply-pipe has a check-valve 21, which is open when the cylinder-chamber is in communication with the source of supply, but is closed by the back pressure from the cylinder-chamber when the source of supply is cut off. The rod of the cylinder-piston serves to limit the ascent of the beam in weighing and for this purpose may be extensible and carries at its upper end a ball which when the beam is raised, describing an arc, will be arrested by and caused to roll on a fixed horizontal surface, which may be the scale-arm, to avoid friction and cramping of the piston-rod in the cylinder. The coil-spring within the cylinder has sufficient tension to keep the piston down and at a fixed distance from the bottom of the cylinder which is determined by a stop 22, which projects from the piston and rests on the bottom of the cylinder when the beam is in a balanced position. The supply-tube has a hose-section 23 to allow the adjustment of the pressure-cylinder and its vent-valve branch on the beam. The article to be weighed having been placed on the platform causes the beam to rise, carrying the piston-rod in contact with the fixed stop 9, which prevents the beam and piston from further ascent. The fluid-pressure is then admitted to the cylinder-chamber beneath the piston, and the latter being prevented from rising the pressure in the chamber forces the beam down and with it the cylinder. The beam having reached a descent a little below its balanced position, the stem of the vent-valve carried by the supply-pipe comes in contact with the hanger-stop, thereby lifting the valve and venting the excess of pressure in the cylinder-chamber, when the beam will rise, closing the vent, and assumes a balanced position. The remaining air in the chamber, tube, and gage will equalize itself and the pressure remaining in the cylinder-chamber will be the exact pressure in pounds and ounces to balance or weigh the article. It will be noted that the check-valve in the supply-tube is at the point of attaching, say, a foot-pump such as used on bicycles, so that the pressure once in the tube cannot pass back or out except the excess, which is automatically vented to depress the beam and coincidently to measure the quantity in the different operations of weighing different articles of different weights. With an air attachment directly on the beam it could be used in a measure with ordinary weights or conjointly in weighing heavy articles within certain limits. A known weight could be hung on the rack at the end of the beam and the excess weight of the article indicated by the gage. For instance, in weighing a railroad car or hogshead of tobacco and knowing the weight to approximate, say, ten thousand pounds a ten-thousand-pounds weight is hung on a scale-beam and the excess of the weight of the article is weighed by the beam-gage. It is also important to note that in forcing the beam down the motive fluid exerts an increasing pressure within the pressure-chamber and within the pressure-gage until the beam reaches and strikes the vent-valve, which is thereby opened for the escape of the air at the vent.

The provision for adjusting the length of the piston-rod is for the purpose of restricting the extent of the downward movement of the beam, and thereby fix the position of the beam at which the vent will be opened for escape of the excess of air-pressure. For this purpose when the piston-rod is shortened the beam will have a greater range of movement before the piston-rod engages the overhead stop than a longer piston-rod would give, and this adjustment, in connection with the adjustment of the vent-valve stop, serves to regulate the extent of the descent of the beam at which the vent-valve will be opened.

It is obvious that the cylinder-spring may be dispensed with, as the placing of the weight upon the platform would cause the beam to rise, carrying with it the cylinder, until the upper end of the piston-rod engages the stop and the stop of the piston engages the bottom of the cylinder, when the pressure in the pressure-chamber will force the beam down and the cylinder with it over the piston, until the beam reaches its balanced position and vents the excess pressure on the beam. It is also obvious that instead of having the piston-rod adjustable in sections to give it greater or less length the same result may be obtained by providing the scale-arm 9 with a horizontal plate-stop 9', adjustable vertically on the arm by a screw.

I claim—

1. In a weighing-scale, a beam, a cylinder seated thereon forming a fluid-pressure chamber, a fluid-pressure-supply tube connected to the pressure-chamber, a pressure-gage in communication with the supply-tube, and means for venting said pressure to balance the beam in weighing.

2. In a weighing-scale, a beam, a cylinder seated thereon forming a pressure-chamber, a fluid-pressure-supply tube connected to the pressure-chamber, a pressure-gage in communication with the supply-tube, and means for securing the cylinder in adjusted positions upon the beam to balance it.

3. In a weighing-scale, a beam, a cylinder seated thereon forming a pressure-chamber, a fluid-pressure-supply tube connected to the pressure-chamber, a pressure-gage in communication with the supply-tube, means for securing the cylinder in adjusted positions on the beam to balance it, a vent-valve in the supply-tube, and an adjustable stop for actuating the valve by the descent of the beam.

4. In a weighing-scale, a beam, a fluid-pressure chamber carried thereon, a fluid-pressure-supply tube connected to the chamber, a pressure-gage in communication with the supply-tube, means operative within the pressure-chamber for causing the pressure therein to force the beam down, an air-venting valve having a depending stem carried by the supply-tube, and a fixed stop against which the valve-stem is carried by the descent of the beam for opening the vent.

5. In a weighing-scale, a beam, a fluid-pressure chamber carried thereon, a fluid-pressure-supply tube connected to the chamber, a pressure-gage in communication with the supply-tube, means operative within the pressure-chamber for causing the pressure therein to force the beam down, and means actuated by the descent of the beam to vent the fluid-pressure to cause the beam to balance in weighing.

6. In a weighing-scale, a beam, a cylinder carried thereon and forming a fluid-pressure chamber, a fluid-pressure-supply tube connected to the pressure-chamber, a piston within the chamber, a stop to limit the descent of the piston within the chamber, a piston-rod, a stop acting on the piston-rod to limit the ascent of the beam, a fluid-pressure gage in communication with the supply-tube and pressure-chamber, and means for venting the pressure-chamber actuated by the descent of the beam.

7. In a weighing-scale, a beam, a cylinder fixed thereon forming a pressure-chamber, a fluid-pressure-supply tube connected to the pressure-chamber, a piston within the cylinder, a piston-rod, a stop acting on the piston-rod to limit the ascent of the beam, a fluid-pressure gage in communication with the supply-tube and pressure-chamber, a vent-valve depending from the supply-tube, a hanger depending from a fixed support and having an adjustable stop for engaging the vent-valve by the descent of the beam, whereby the beam is caused to balance itself in weighing.

8. In a weighing-scale, a beam, a cylinder fixed thereon forming a pressure-chamber, a fluid-pressure-supply tube connected to the pressure-chamber, a piston within the cylinder, a piston-rod, a stop acting on the piston-rod to limit the ascent of the beam, a fluid-pressure gage in communication with the supply-tube and pressure-chamber, and means for automatically venting the pressure in the chamber at a predetermined point by the descent of the beam.

9. In a weighing-scale, a beam, a cylinder fixed thereon forming a fluid-pressure chamber, a fluid-pressure-supply tube connected to the chamber, a pressure-gage in communication with the supply-tube, means operative within the cylinder for causing the pressure therein to force the beam down, means for limiting the ascent of the beam, and means for venting the pressure-chamber rendered operative by the descending movement of the beam.

10. In a weighing-scale, a beam, a cylinder seated thereon forming a pressure-chamber, a fluid-pressure-supply tube connected to the pressure-chamber, a pressure-gage in communication with the supply-tube, a piston and piston-rod and means operative on the piston-rod above the cylinder for causing the pressure therein to force the beam down, a pressure-venting valve, and a stop below the beam for opening the valve by the downward movement of the beam.

11. In a weighing-scale, a beam, a cylinder forming a pressure-chamber carried upon and by the beam, means for securing the cylinder in adjusted positions upon the beam, a fluid-pressure-supply tube connected to the cylinder-chamber, a pressure-gage in communication with said tube, a vent-valve for the chamber carried by the tube, an adjustable stop for automatically opening said valve by the downward movement of the beam, means for securing said stop in adjusted positions laterally in relation to said vent-valve stem, means operative within the pressure-chamber for causing the pressure therein to force the beam down, and means for limiting the ascent of the beam.

12. In a weighing-scale, a beam, a cylinder seated thereon forming a fluid-pressure chamber, a fluid-pressure-supply tube connected to the pressure-chamber, a pressure-gage in communication with the supply-tube, means for securing the cylinder in adjusted positions laterally on the beam to balance it, a vent-valve in the supply-tube having a depending stem, a vertically-adjustable stop for engaging the valve-stem, a hanging support for said stop, and means for securing said stop-support in laterally-adjusted positions with respect to the valve.

In testimony whereof I have signed my name to this specification in the presence of two subscribing witnesses.

HOWARD FEILD JONES.

Witnesses:
 J. H. NEWBURY,
 J. R. EDMUNDSON.